(12) United States Patent
Kuramochi et al.

(10) Patent No.: US 11,300,729 B2
(45) Date of Patent: Apr. 12, 2022

(54) METHOD FOR MANUFACTURING OPTICAL DEVICE

(71) Applicant: Nippon Telegraph and Telephone Corporation, Tokyo (JP)

(72) Inventors: Eiichi Kuramochi, Tokyo (JP); Hisashi Sumikura, Tokyo (JP); Masaaki Ono, Tokyo (JP); Akihiko Shinya, Tokyo (JP); Masaya Notomi, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/252,788

(22) PCT Filed: Jun. 4, 2019

(86) PCT No.: PCT/JP2019/022150
§ 371 (c)(1),
(2) Date: Dec. 16, 2020

(87) PCT Pub. No.: WO2020/003918
PCT Pub. Date: Jan. 2, 2020

(65) Prior Publication Data
US 2021/0215877 A1    Jul. 15, 2021

(30) Foreign Application Priority Data
Jun. 25, 2018  (JP) .............................. JP2018-119531

(51) Int. Cl.
*G02B 6/13* (2006.01)
*B82Y 40/00* (2011.01)
*G02B 6/122* (2006.01)
*G02B 5/00* (2006.01)
*H01S 3/063* (2006.01)

(52) U.S. Cl.
CPC ............... *G02B 6/13* (2013.01); *B82Y 40/00* (2013.01); *G02B 5/008* (2013.01); *G02B 6/122* (2013.01); *G02B 6/1226* (2013.01); *H01S 3/063* (2013.01)

(58) Field of Classification Search
None
See application file for complete search history.

(56) References Cited

FOREIGN PATENT DOCUMENTS

JP    2014-27168 A  *  2/2014

OTHER PUBLICATIONS

English translation of written opinion for PCT/JP2019/022150, dated Aug. 27, 2019. (Year: 2019).*

(Continued)

*Primary Examiner* — Michael Stahl
(74) *Attorney, Agent, or Firm* — Slater Matsil, LLP

(57) ABSTRACT

An active medium piece (109), which has been taken out using a nanoprobe (108), is processed so as to match the shape of a nanoslot (104), and thus an active medium small piece (111) that is smaller than the active medium piece (109) is formed (a fourth step). For example, irradiation with an ion beam (110) is performed so that the active medium piece (109) is shaped (processed) into an active medium small piece (111) that has a three-dimensional shape suitable for being placed in the nanoslot (104). The active medium piece (109) is processed into the active medium small piece (111) in the state of being held by the nanoprobe (108).

15 Claims, 11 Drawing Sheets

(56) References Cited

OTHER PUBLICATIONS

Kuramochi et al., "Air-slotted Si H1 photonic crystal nanocavity withan ultrahigh Q/V value," Achieving High Q/V Values with H1-Slot Nano-Resonators, Proceedings of the 64th JSAP Spring Meeting, 2017, 1 page.
Kuramochi Sakae, et al. "High, Q/V and Slot Effect in a Value H1 Slot Nano-Resonator Slot effect in ultrahigh, Q/V, H1 photonic crystal nanocavities with a subwavelength slot," Proceedings of the 78th JSAP Autumn Meeting, 2017, 1 page.
Ono et al., "Deep-subwavelength plasmonic mode converterwith large size reduction for Si-wire waveguide," Optical Society of America, vol. 3, No. 9, Sep. 2, 2016, pp. 999-1005.
Ono et al. "Nanowire-nanoantenna coupled system fabricated by nanomanipulation," Optic Express, vol. 24, No. 8, Apr. 12, 2016, pp. 8647-8659.
Yokoo et al., Subwavelength Nanowire Lasers on a SiliconPhotonic Crystal Operating at TelecomWavelengths, American Chemical Society, vol. 4, 2017, pp. 355-362.

\* cited by examiner

METHOD FOR MANUFACTURING OPTICAL DEVICE

CROSS-REFERENCE TO RELATED APPLICATIONS

This application is a national phase entry of PCT Application No. PCT/JP2019/022150, filed on Jun. 4, 2019, which claims priority to Japanese Application No. 2018-119531, filed on Jun. 25, 2018, which applications are hereby incorporated herein by reference.

TECHNICAL FIELD

The present invention relates to a method for manufacturing an optical device that is provided with a nanoslot that has a width of 200 nm or less.

BACKGROUND

A photonic crystal is an artificial material that has a periodic crystal structure that is formed from two or more kinds of media that have different refractive indexes, and has the function of controlling propagation, refraction, and reflection of light, the function of capturing light, and so on. It is possible to provide a nanocavity in the photonic crystal, which confines light within a small volume with dimensions that are several times the crystal intervals. In recent years, a photonic crystal cavity has also been proposed, which is a nanocavity in which a slot structure that has a width of 200 nm or less and is formed from vacuum, air, or a low refractive index medium is provided at the center of the nanocavity (see NPL 1). In a nanocavity that employs such a slot structure (a slot nanocavity), when appropriately designed, the electric field in the slot can be significantly enhanced compared to a normal nanocavity without a slot.

The width of the slot is significantly smaller than the photonic crystal period, and therefore the optical confinement volume is even smaller than that of a normal nanocavity without a slot. Due to the slot being provided, it is possible to realize a design in which a cavity mode volume (V) is significantly smaller than $1(\lambda/2n)^3$ ($\lambda$: the wavelength, n: the refractive index at the cavity center). Such a design cannot be realized using a nanocavity without a slot.

In a slot nanocavity, by placing the luminescent center of an active medium that has an optical gain or an optical nonlinear effect, or quantum dots or a diamond NV center, at a position in the slot, it is possible to significantly enhance the light-matter interaction between these matters and a cavity mode, which makes it possible to use the slot nanocavity as a high-performance optical device. A slot nanocavity also has excellent properties as a laser medium and a light absorbing medium, and perovskite optical materials, which have been actively researched and developed recently, are also potential candidates that can be used as an active medium in combination with a slot.

In the meantime, a MIM (metal-insulator-metal) waveguide in which a parallel nanogap that has a width of 200 nm or less is provided between two metal patterns has been researched and developed (see NPL 2). It has been shown that a MIM waveguide can strongly confine the electric field of a plasmon mode in the nanogap part, and can also enhance the electric field strength. The nanogap and the electric field in the nanogap in the MIM plasmon waveguide can be considered to be equivalent to the aforementioned nanoslot in terms of dimensions and physics/physical properties. It can be envisaged that slot nanocavities and nanogap plasmon waveguides have common issues with respect to the active medium placed in the slot, the technology required for manufacturing, and problems.

It is necessary to perform nanofabrication in order to selectively place an active nanostructure or an active medium in the aforementioned nanoslot. However, at the moment, there is no industrially established nanofabrication technology that can realize selective placement in the nanoslot. Examples of potential candidate technologies include post-processing using a nanoprobe. Based on the AFM (Atomic Force Microscope) technology that allows for nano-scale three-dimensional surface observation, studies have been conducted on AFM lithography for directly picking up a nano substance, using an AFM probe, and moving and placing the picked-up substance (see NPL 3). For example, a dip pen lithography apparatus that allows for application of a fluid, using an AFM probe, has become commercially available.

In addition, a nano-manipulation technology using a nanoprobe that does not have the AFM probe function has also been studied (see NPL 4).

CITATION LIST

Non Patent Literature

[NPL 1] Eiichi Kuramochi et al., "Air-slotted Si H1 photonic crystal nanocavity with an ultrahigh Q/V value", the $64^{th}$ JSAP Spring Meeting, lecture preprints, 16a-F202-8, 2017.

[NPL 2] M. Ono et al., "Deep-subwavelength plasmonic mode converter with large size reduction for Si-wire waveguide", Optical Society of America, vol. 3, no. 9, pp. 900-1005, 2016.

[NPL 3] A. Yokoo et al., "Subwavelength Nanowire Lasers on a Silicon Photonic Crystal Operating at Telecom Wavelengths", American Chemical Society, vol. 4, pp. 355-362, 2017.

[NPL 4] M. Ono et al., "Nanowire-nanoantenna coupled system fabricated by nanomanipulation", Optics Express, vol. 24, no. 8, pp. 8647-8659, 2016.

[NPL 5] Eiichi Kuramochi et al., "Slot effect in ultrahigh Q/V H1 photonic crystal nanocavities with a subwavelength slot", the $78^{th}$ JSAP Autumn Meeting, lecture preprints, 6a-A405-1, 2017.

SUMMARY

Technical Problem

The slot width of the above-described nanoslot device is usually designed to be significantly smaller than 100 nm in order to obtain a strong optical confinement effect and electric field enhancing effect using the nanoslot. In addition, in order to maximize the capabilities of the nanoslot device, the active nanostructure or nano medium need to be selectively placed only in the slot. Conventional manufacturing technologies such as the AFM lithography have position resolution and position selectivity in the order of nanometers.

However, in a conventional nanoprobe such as an AFM probe, the radius of curvature of the tip of the probe is 100 nm or more, and it cannot be said that the shape of the tip of the nanoprobe is sufficiently sharp to selectively fill an active medium into the nanoslot. In order to place the active medium in the slot using the nanoprobe in the current state, the active medium needs to be self-formed into a shape that matches the shape of the slot, like the nanowire disclosed in NPL 3. Therefore, if the shape of the active medium does not match the shape of the slot, or if the active medium is smaller than the slot, like a nanoparticle that contains a quantum dot or a luminescent center, there is a problem in that, with the current technology, it is not possible to place such an active medium in the slot, using a nanoprobe.

Embodiments of the present invention have been made in view of the above-described problem, and an object of embodiments of the present invention is to make it possible to selectively place a desired active medium in a nanoslot, using a nanoprobe.

Means for Solving the Problem

An optical device manufacturing method according to embodiments of the present invention includes: a first step of manufacturing an optical device basic structure that is provided with a nanoslot; a second step of manufacturing a layer of an active medium; a third step of forming an active medium piece by taking out a portion of the layer, using a nanoprobe; a fourth step of processing the active medium piece, which has been taken out using the nanoprobe, so as to match the shape of the nanoslot, to form an active medium small piece that is smaller than the active medium piece; and a fifth step of placing the active medium small piece, which has been taken out using the nanoprobe and has been processed, in the nanoslot.

In the above-described optical device manufacturing method, active medium particles that are smaller than the slot are dispersed in the layer of the active medium.

In the above-described optical device manufacturing method, in the fourth step, irradiation with an ion beam is performed to process the active medium piece so as to match the shape of the nanoslot, thereby forming the active medium small piece.

In the above-described optical device manufacturing method, the optical device basic structure is a photonic crystal cavity, and the nanoslot is located at a cavity center.

In the above-described optical device manufacturing method, the optical device basic structure is a plasmon waveguide that is constituted by two metal patterns, and the nanoslot is located between the two metal patterns.

Effects of Embodiments of the Invention

As described above, according to embodiments of the present invention, an active medium piece is formed by taking out a portion of a layer of an active medium, using a nanoprobe, and an active medium small piece that is smaller than the active medium piece is formed by processing the active medium piece so as to match the shape of the nanoslot. Therefore, it is possible to achieve an excellent effect that a desired active medium can be selectively placed in the nanoslot, using a nanoprobe.

DETAILED DESCRIPTION OF ILLUSTRATIVE EMBODIMENTS

The following describes an optical device manufacturing method according to embodiments of the present invention.

First Embodiment

First, an optical device manufacturing method according to a first embodiment of the present invention will be described with reference to FIGS. 1A to 1F.

Figure 1A:
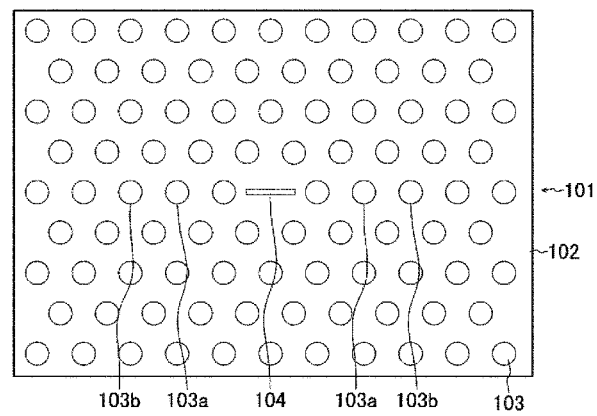
FIG. 1A is a plan view showing a state in an intermediate process in order to illustrate an optical device manufacturing method according to a first embodiment of the present invention.

First, as shown in FIG. 1A, a photonic crystal 101 is manufactured. The photonic crystal 101 includes a base 102 and a plurality of columnar lattice elements 103 that are formed in the base 102. The lattice elements 103 are provided in the base 102 at regular intervals that are no longer than the target optical wavelength. The refractive index of the lattice elements 103 is different from that of the base 102. The plurality of lattice elements 103 are arranged in a triangular lattice in plan view, for example. The lattice elements 103 are cylindrical through holes that penetrate through the base 102 from the front side to the back side, for example, and are made of air.

The photonic crystal 101 is also provided with a nanoslot 104 located at the center of the area to be an optical cavity (a cavity center). In the first embodiment, the photonic crystal 101 is an optical device basic structure in which a photonic crystal serves as an optical cavity. The nanoslot 104 is a rectangular parallelepiped hole.

In the photonic crystal 101, the base 102 is made of silicon, and the plate thickness of the base 102 is approximately 210 nm, for example. The height of the lattice elements 103, which penetrate through the base 102, is approximately 210 nm. A lattice constant a is approximately 460 nm, and the diameter of the lattice elements 103 is approximately a/4, for example. Lattice elements 103a that are arranged in the left and right of the nanoslot 104 on the sheet of FIG. 1A, are shifted away from the nanoslot 104 by approximately 0.12a. Lattice elements 103b are also shifted away from the nanoslot 104, and the amount of shift is approximately 0.50 times the amount of shift of the lattice elements 103a.

The length of the nanoslot 104 in the left-right direction of the sheet of FIG. 1A is approximately 400 nm, and the width of the nanoslot 104 is approximately 30 nm to 70 nm, for example.

With the above-described setting, an electric field is concentrated on a single antinode in the nanoslot 104, and a nanocavity mode with a Q value that is no less than tens of thousands and a mode volume that is significantly smaller than $1(\lambda/2n)^3$ can be realized. For example, a theoretical Q value that is no less than tens of thousands can be obtained. In particular, the highest Q value can be obtained when the width of the nanoslot 104 is approximately 40 nm.

Note that, as described in NPL 5, the basic capabilities of the optical cavity can be kept at the same level even if the refractive index of the lattice elements 103 is increased to approximately n=1.5 with the base 102 made of Si. If the refractive indexes of all the low refractive index portions, including the lattice elements 103, are modulated in addition to the refractive index of the nanoslot 104, capabilities such as the Q value and the mode volume are kept at the same level, whereas, if only the nanoslot 104 is filled with an active medium and the lattice elements 103 are left as air, capabilities such as the Q value and the mode volume are kept at almost the same high level as those when all the low refractive index media are air.

Figure 1B:
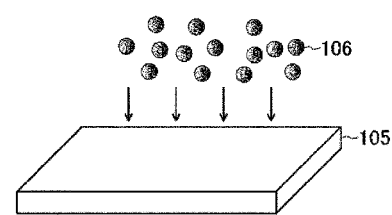
FIG. 1B is a perspective view showing a state in an intermediate process in order to illustrate the optical device manufacturing method according to the first embodiment of the present invention.
Figure 1C:
FIG. 1C is a perspective view showing a state in an intermediate process in order to illustrate the optical device manufacturing method according to the first embodiment of the present invention.

Next, as shown in FIG. 1B, particles 106 of an active medium are dispersed in a layer 105 that serves as a base material, and thus a layer 107 of the active medium is manufactured as shown in FIG. 1C (a second step). The particles 106 are quantum dots that are smaller than the nanoslot 104 and are useful as a nano-luminescent material, such as ZnS or ZnSe, or diamond nanoparticles that include a luminescent center, such as a nitrogen impurity (an NV center) or a Si impurity (a SiV center). It is difficult to arrange these fine particles in the nanoslot 104 by directly manipulating them using a nanoprobe or as a simple substance. However, it is possible to make the fine particles available as an active medium by forming the layer 107 by dispersing or doping the fine particles as a guest medium in the layer 105 in which a polymer such as PMMA (polymethyl methacrylate) serves as a host medium. The number and density of quantum dots and luminescent centers can be controlled by making an adjustment to dispersion or doping. A material that can be easily formed into a film and does not impair the capabilities of the guest medium may be selected as the layer 105 that serves as a host medium.

Note that fluorophores that have a gain for realizing laser oscillation, such as $DCM/AlQ_3$, perovskite materials that have excellent light absorption properties, and so on can be formed as a thin film, and such a thin film can be used as the layer 107. In any case, the thickness of the layer 107 is preferably equal to or less than the height of the nanoslot 104 so that it can be easily placed in the nanoslot 104.

Figure 1D:
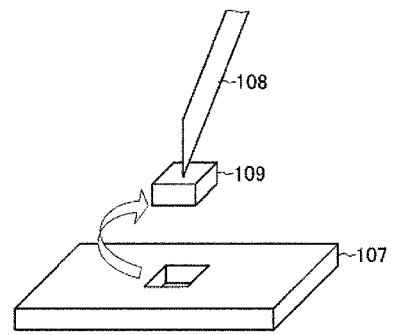
FIG. 1D is a perspective view showing a state in an intermediate process in order to illustrate the optical device manufacturing method according to the first embodiment of the present invention.

Next, as shown in FIG. 1D, an active medium piece 109 is manufactured by taking out (cutting out) a portion of the layer 107, using a nanoprobe 108 (a third step). Regarding the step of taking out carried out using the nanoprobe 108, an amount of active medium that is required and can be handled using the nanoprobe 108 is taken out from the layer 107, which serves as the active medium piece 109. Because shaping will be performed later, it is unnecessary to precisely control the shape of the active medium piece 109 at this time. It is only necessary that the dimensions of the active medium piece 109 are not smaller than the requirements. Note that, if it is impossible to take out a necessary shape or amount of active medium piece 109 by only using the nanoprobe 108, the layer 107 may be shaped in advance so as to approximately have the required dimensions, using lithography or patterning with an ion beam, which are well-known techniques.

Figure 1E:
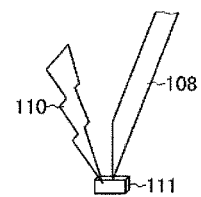
FIG. 1E is a perspective view showing a state in an intermediate process in order to illustrate the optical device manufacturing method according to the first embodiment of the present invention.

Next, the active medium piece 109, which has been taken out using the nanoprobe 108, is processed so as to match the shape of the nanoslot 104, and thus an active medium small piece 111 that is smaller than the active medium piece 109 is formed as shown in FIG. 1E (a fourth step). For example, irradiation with an ion beam no is performed so that the active medium piece 109 is shaped (processed) into an active medium small piece 111 that has a three-dimensional shape suitable for being placed in the nanoslot 104. At this time, the active medium piece 109 is processed into the active medium small piece 111 in the state of being held by the nanoprobe 108.

For example, the focused ion beam (FIB) method in a vacuum, which is common in these days, may be employed to perform the processing using the ion beam no. A portion exposed to the ion beam 110 is removed through etching. Thus, the damage on the shaped active medium small piece 111 caused due to the processing performed using the ion beam is limited to a minimum. As reported in NPL 4, it is possible to successively perform processing with an ion beam and processing or manipulation with a nanoprobe if functions are integrated in the same apparatus.

Figure 1F:
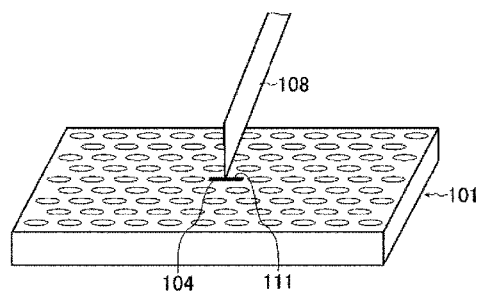
FIG. 1F is a perspective view showing a state in an intermediate process in order to illustrate the optical device manufacturing method according to the first embodiment of the present invention.

Next, as shown in FIG. 1F, the active medium small piece 111, which has been taken out using the nanoprobe 108 and has been processed, is placed in the nanoslot 104 (a fifth step). Generally, the tip of the nanoprobe 108 is larger than the nanoslot 104, which has a width of 100 nm or less, and it cannot be said that the tip is sufficiently thin. However, according to the first embodiment, the shape of the active medium small piece 111 has been three-dimensionally processed in advance so as to match the shape of the nanoslot 104. Therefore, it is easier to place the active medium small piece 111 in the nanoslot 104.

Second Embodiment

Next, an optical device manufacturing method according to a second embodiment of the present invention will be described with reference to FIGS. 2A to 2E.

Figure 2A:
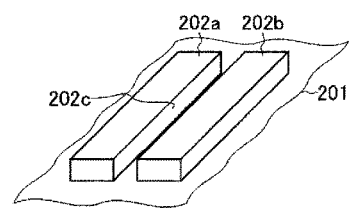
FIG. 2A is a perspective view showing a state in an intermediate process in order to illustrate an optical device manufacturing method according to a second embodiment of the present invention.

First, as shown in FIG. 2A, a plasmon waveguide (an optical device basic structure) that is constituted by two metal patterns 202a and 202b is formed on a substrate 201 (a first step). A gap 202c between the metal pattern 202a and the metal pattern 202b is approximately within the range of 20 nm to 100 nm. With this configuration, surface plasmon polaritons are excited due to the interaction between the surface plasmons on the metal patterns 202a and 202b and light in the gap 202c, and a plasmon mode is realized (see NPL 2).

The plasmon mode confinement and the electric field strength are maximized by setting the thickness of the metal patterns 202a and 202b to approximately 20 nm (see NPL 2). Note that the thickness of the metal patterns 202a and 202b may be set to approximately 200 nm depending on the intended use. In this way, a nanoslot is provided in the gap 202c between the metal pattern 202a and the metal pattern 202b, in which a plasmon mode is realized. In other words, the nanoslot of the plasmon waveguide according to the second embodiment is the gap 202c. It is envisaged that the shape of the nanoslot (the gap 202c) in a cross-sectional view is rectangular, and the dimensions thereof is within the range of 20×20 (nm) to 200×200 (nm).

Figure 2B:
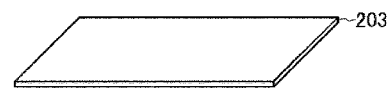
FIG. 2B is a perspective view showing a state in an intermediate process in order to illustrate the optical device manufacturing method according to the second embodiment of the present invention.

Next, as shown in FIG. 2B, a layer 203 of an active medium is formed (a second step). In the second embodiment, the active medium is constituted by a layered substance in which one or a plurality of two-dimensional unit layers are stacked, for example. The layered material is, for example, graphene, hexagonal boron nitride (h-BN), boron phosphide (BP), or a transition metal dichalcogenide such as $WS_2$ or $MoS_2$. In recent years, these layered substances have been proved to exhibit significantly useful optical properties. The thickness of the layer 203 constituted by such a layered substance is 10 nm or less. Alternatively, a heterostructure constituted by a plurality of layered substances may be employed, and the thickness of the layer 203 in this case is several tens of nanometers.

Figure 2C:
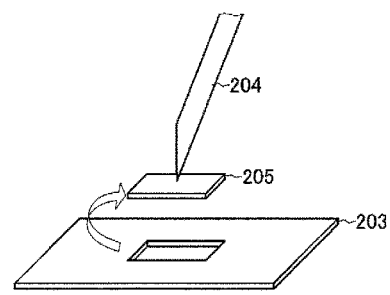
FIG. 2C is a perspective view showing a state in an intermediate process in order to illustrate the optical device manufacturing method according to the second embodiment of the present invention.

Next, as shown in FIG. 2C, an active medium piece 205 is manufactured by taking out (cutting out) a portion of the layer 203, using a nanoprobe 204 (a third step). Regarding the step of taking out carried out using the nanoprobe 204, an amount of active medium that is required and can be handled using the nanoprobe 204 is taken out from the layer 203, which serves as the active medium piece 205. Because shaping will be performed later, it is unnecessary to precisely control the shape of the active medium piece 205 at this time. It is only necessary that the dimensions of the active medium piece 205 are not smaller than the requirements. Note that, if it is impossible to take out a necessary shape or amount of active medium piece 205 by only using the nanoprobe 204, the layer 203 may be shaped in advance so as to approximately have the required dimensions, using lithography or patterning with an ion beam, which are well-known techniques.

Figure 2D:
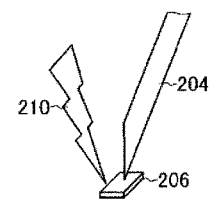
FIG. 2D is a perspective view showing a state in an intermediate process in order to illustrate the optical device manufacturing method according to the second embodiment of the present invention.

Next, the active medium piece 205, which has been taken out using the nanoprobe 204, is processed so as to match the shape of the gap 202c, and thus an active medium small piece 206 that is smaller than the active medium piece 205 is formed as shown in FIG. 2D (a fourth step). For example, irradiation with an ion beam 210 is performed so that the active medium piece 205 is shaped (processed) into an active medium small piece 206 that has a three-dimensional shape suitable for being placed in the gap 202c. At this time, the active medium piece 205 is processed into the active medium small piece 206 in the state of being held by the nanoprobe 204.

For example, the FIB method in a vacuum may be employed to perform the processing using the ion beam 210. A portion exposed to the ion beam 210 is removed through etching. Thus, the damage on the shaped active medium small piece 206 caused due to the processing performed using the ion beam is limited to a minimum.

Figure 2E:
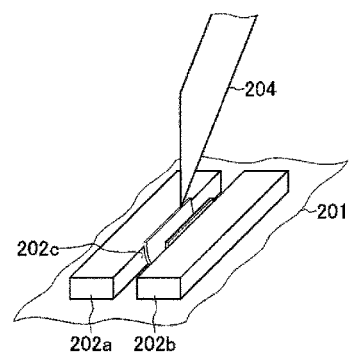
FIG. 2E is a perspective view showing a state in an intermediate process in order to illustrate the optical device manufacturing method according to the second embodiment of the present invention.

Next, as shown in FIG. 2E, the active medium small piece 206, which has been taken out using the nanoprobe 204 and has been processed, is placed in the gap 202c (a fifth step). Generally, the tip of the nanoprobe 204 is larger than the gap 202c, which has a width of 100 nm or less, and it cannot be said that the tip is sufficiently thin. However, according to the second embodiment, the shape of the active medium small piece 206 has been three-dimensionally processed in advance so as to match the shape of the gap 202c. Therefore, it is easier to place the active medium small piece 206 in the gap 202c.

As described above, according to embodiments of the present invention, an active medium piece is formed by taking out a portion of a layer of an active medium, using a nanoprobe, and an active medium small piece that is smaller than the active medium piece is formed by processing the active medium piece so as to match the shape of the nanoslot. Therefore, it is possible to selectively place a desired active medium in the nanoslot, using the nanoprobe.

The nanoslot has a width that is smaller than 200 nm. Therefore, conventionally, it is not easy to selectively place an active medium only in the nanoslot. In particular, there has been no proposal of a specific technique for reliably placing an active medium in a nanoslot, using a nanoprobe. Conventionally, it is necessary to form a nanowire or the like that has a shape that matches the size of the slot without assistance. Embodiments of the present invention make it easy and practical to realize a slot device that employs various active materials for utilizing the photo-matter interaction enhancing effect of a nanoslot, without being limited to the conventional method that employs a nanowire.

According to embodiments of the present invention, the active medium small piece placed in the slot does not necessary fill the entire slot, and there may be a gap. Also, instead of completing the embedding of the active medium small piece by operating the nanoprobe only once, it is possible to realize the embedding by repeating the operation a plurality of times. Also, small pieces of different active media may be accumulated in the slot through a plurality of embedding operations.

Note that the present invention is not limited to the above-described embodiments, and it is obvious that a person skilled in the art can implement various modifications or combinations within the technical idea of the present invention.

REFERENCE SIGNS LIST

101 Photonic crystal
102 Base
103 Lattice element
104 Nanoslot
105 Layer
106 Particle
107 Layer
108 Nanoprobe
109 Active medium piece
110 Ion beam
111 Active medium small piece.

The invention claimed is:
1. An optical device manufacturing method comprising:
   manufacturing an optical device basic structure that is provided with a nanoslot;
   manufacturing a layer of an active medium;
   forming an active medium piece by taking out a portion of the layer using a nanoprobe;
   processing the active medium piece so as to match a shape of the nanoslot and to form an active medium small piece that is smaller than the active medium piece; and
   placing the active medium small piece in the nanoslot.

2. The optical device manufacturing method according to claim 1, wherein active medium particles that are smaller than the nanoslot are dispersed in the layer.

3. The optical device manufacturing method according to claim 2, wherein the active medium particles are ZnS, ZnSe, or diamond nanoparticles that include a luminescent center.

4. The optical device manufacturing method according to claim 3, wherein the luminescent center is a nitrogen impurity or a Si impurity.

5. The optical device manufacturing method according to claim 1, wherein processing the active medium piece comprises irradiating with an ion beam to process the active medium piece so as to form the active medium small piece.

6. The optical device manufacturing method according to claim 1, wherein the optical device basic structure is a photonic crystal cavity, and the nanoslot is located at a cavity center of the photonic crystal cavity.

7. The optical device manufacturing method according to claim 1, wherein the optical device basic structure is a plasmon waveguide that comprises two metal patterns, and the nanoslot is located between the two metal patterns.

8. The optical device manufacturing method according to claim 7, wherein the plasmon waveguide is constituted by the two metal patterns.

9. An optical device manufacturing method comprising:
manufacturing a layer of an active medium;
forming an active medium piece by removing a portion of the layer using a nanoprobe;
processing the active medium piece so as to match a shape of a nanoslot of an optical device and to form an active medium small piece, the active medium small piece being smaller than the active medium piece; and
placing the active medium small piece in the nanoslot.

10. The optical device manufacturing method according to claim 9 further comprising manufacturing the optical device.

11. The optical device manufacturing method according to claim 9, wherein active medium particles that are smaller than the nanoslot are dispersed in the layer.

12. The optical device manufacturing method according to claim 9, wherein processing the active medium piece comprises irradiating with an ion beam to process the active medium piece so as to match the shape of the nanoslot and to form the active medium small piece.

13. The optical device manufacturing method according to claim 9, wherein the optical device is a photonic crystal cavity, and the nanoslot is located at a cavity center of the photonic crystal cavity.

14. The optical device manufacturing method according to claim 9, wherein the optical device is a plasmon waveguide that comprises two metal patterns, and the nanoslot is located between the two metal patterns.

15. The optical device manufacturing method according to claim 14, wherein the plasmon waveguide is constituted by the two metal patterns.

* * * * *